Figure 1:
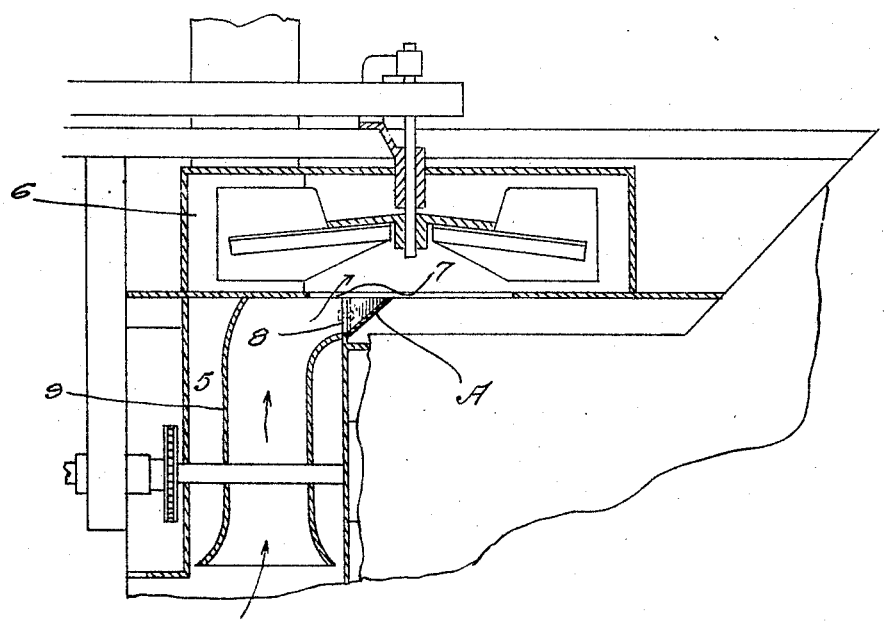

Feb. 16, 1926.

E. HEITZMAN 1,573,064

ATTACHMENT FOR CORN SHELLERS

Filed Oct. 13, 1925

Inventor
E. Heitzman
By Clarence A. O'Brien
Attorney

Patented Feb. 16, 1926.

1,573,064

UNITED STATES PATENT OFFICE.

EMANUEL HEITZMAN, OF ALEXANDRIA, SOUTH DAKOTA.

ATTACHMENT FOR CORN SHELLERS.

Application filed October 13, 1925. Serial No. 62,279.

*To all whom it may concern:*

Be it known that I, EMANUEL HEITZMAN, a citizen of the United States, residing at Alexandria, in the county of Hanson and State of South Dakota, have invented certain new and useful Improvements in Attachments for Corn Shellers, of which the following is a specification.

The present invention relates to improvements in corn shellers of the type placed on the market by King and Hamilton Company, the assignee of Letters Patent No. 1,322,393, dated November 18, 1919.

The improvement relates more specifically to the modification shown in Figure 8 of said patent. My invention consists in moving the whole upper blower attachment ahead or forward which will cause a greater suction through the cobs which feed out on the shaker before entering the cob carrier. In order to prevent the wastage of corn which the stronger suction would tend to do I provide an improved baffle plate.

The prime object of the invention is to clean the cobs of dust. The purpose of this is that the cobs are valuable as a fuel when cleaned.

With the above and other similar objects in view as will appear as the description proceeds, the invention resides in certain novel details of construction, and in the combination and arrangement of parts as will be hereinafter more fully described and claimed.

In the drawing:—

Figure 2:
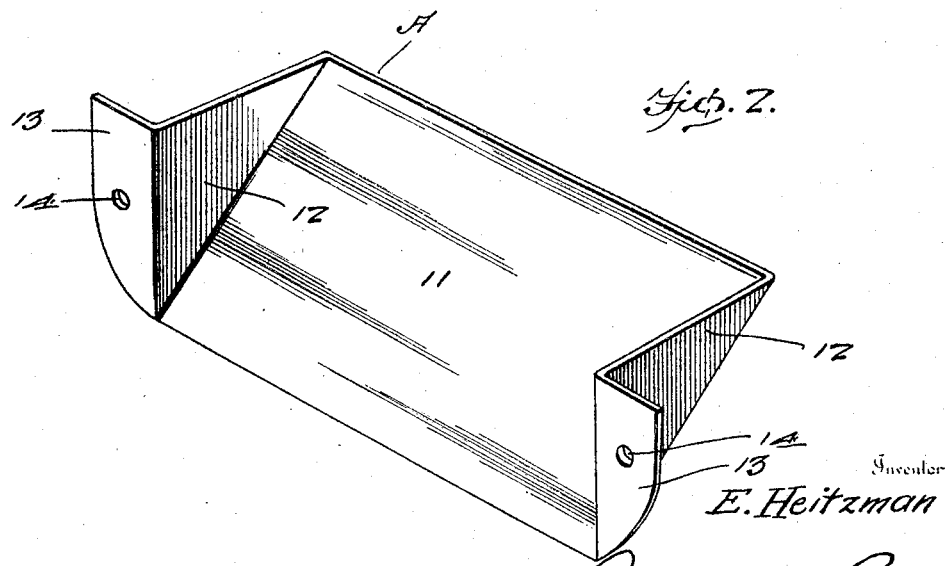

Figure 1 is a fragmentary sectional elevation taken longitudinally through a corn sheller showing my improvements incorporated therein, Figure 2 is a detail perspective view of the baffle.

Referring to the drawing in detail it will be seen that 5 designates the shelling concave of the corn sheller of the type mentioned above. The blower or fan 6 has been moved forwardly so that the opening 7 in the bottom thereof extends partially over the top of the concave 5. An opening 8 is provided in the rear wall of the concave 5. The hood 9 is disposed in the concave 5 and communicates with the blower 6 through openings 7 and 8 as is clearly shown in Figure 1. This moving forwardly of the blower 6 creates a greater current through the hood casing so as to clean the cobs of dust and husks as well as the shelled grain.

To prevent waste of corn which the stronger suction would tend to cause, I have constructed a baffle plate indicated generally by the letter A. This baffle plate A includes a plate body 11, right triangular shaped ends 12 having their hypotenuse edges merging into the end edges of the plate body. These ends extend in planes rectangular to the plane of the body 11. Flanges 13 project laterally from one of the edges of the ends 12. These flanges 13 are in the same plane with each other, and said plane is obliquely disposed to the plane of the body 11. The flanges 13 are apertured as at 14 so as to be fastened to the rear wall of the concave 5 to each side of the opening 8.

It is thought that the construction, operation, and utility of the improvement will be readily appreciated by those skilled in this art without a more detailed description thereof.

It is desired, however, to point out that numerous changes in the details of construction, and in the combination and arrangement of parts may be resorted to without departing from the spirit or scope of the invention as hereinafter claimed or sacrificing any of its advantages.

Having thus described my invention, what I claim is:—

A corn sheller including, in combination, a concave, a hood extending through the concave, a blower having an opening partially communicating with the upper end of the concave, the rear wall of the concave provided with an opening adjacent the opening in the blower, said hood casing communicating with the openings, and a baffle plate comprising a body plate having rectangularly disposed right triangular ends with the hypotenuse edges merging with the end edges of the body plate, one leg edge of each end merging into an outwardly disposed lateral flange adapted to be fixed to the rear wall of the concave adjacent the opening therein.

In testimony whereof I affix my signature.

EMANUEL HEITZMAN.